United States Patent
Baryudin et al.

(10) Patent No.: US 10,613,973 B1
(45) Date of Patent: Apr. 7, 2020

(54) GARBAGE COLLECTION IN SOLID STATE DRIVES

(71) Applicant: Amazon Technologies, Inc., Reno, NV (US)

(72) Inventors: Leonid Baryudin, San Jose, CA (US); Phillip Peterson, Seattle, WA (US); Daniel Sladic, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/393,033

(22) Filed: Dec. 28, 2016

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/064* (2013.01); *G06F 3/0616* (2013.01); *G06F 3/0652* (2013.01); *G06F 3/0665* (2013.01); *G06F 3/0679* (2013.01); *G06F 2212/1016* (2013.01); *G06F 2212/1036* (2013.01); *G06F 2212/152* (2013.01); *G06F 2212/214* (2013.01); *G06F 2212/7201* (2013.01); *G06F 2212/7205* (2013.01)

(58) Field of Classification Search
CPC .... G06F 12/0246; G06F 3/061; G06F 3/0616; G06F 3/064; G06F 3/0652; G06F 3/0665; G06F 3/0679; G06F 2212/1016; G06F 2212/1036; G06F 2212/152; G06F 2212/214; G06F 2212/7201; G06F 2212/7205
See application file for complete search history.

(56) References Cited

U.S. PATENT DOCUMENTS

| 8,793,429 | B1 | 7/2014 | Call |
| 9,323,667 | B2 | 4/2016 | Bennett |
| 9,489,296 | B1* | 11/2016 | Tomlin ................ G06F 12/0253 |
| 9,817,576 | B2 | 11/2017 | Hayes |
| 2003/0163594 | A1 | 8/2003 | Aasheim et al. |
| 2009/0150599 | A1 | 6/2009 | Bennett |
| 2009/0157989 | A1* | 6/2009 | Karamcheti ........ G06F 12/0246 711/156 |

(Continued)

OTHER PUBLICATIONS

International Search Report and Written Opinion issued in related Application No. PCT/US2017/053763 dated Dec. 20, 2017.

(Continued)

*Primary Examiner* — Nanci N Wong
(74) *Attorney, Agent, or Firm* — Hogan Lovells US LLP

(57) ABSTRACT

In a solid state drive, a journal may be associated with a cluster block, such that the journal stores updates to an indirection mapping data structure for that cluster block. The journals may be stored on the cluster block. During garbage collection these spatially coupled journals can be retrieved and used to determine the data written to each media location within the cluster block. Logical and physical address information can be determined from the journal content, and used to compare against the current mapping in the indirection mapping data structure, to determine the validity of each media location. Since the journals are physical media aware, this comparison can occur without the consultation of a bad block tracking structure. When a physical media address is deemed to hold valid data it will be relocated as part of garbage collection processing.

18 Claims, 8 Drawing Sheets

(56) References Cited

U.S. PATENT DOCUMENTS

| | | | |
|---|---|---|---|
| 2009/0282301 A1* | 11/2009 | Flynn | G06F 11/006 714/710 |
| 2010/0070735 A1 | 3/2010 | Chen et al. | |
| 2011/0060864 A1 | 3/2011 | Yoshii et al. | |
| 2011/0238898 A1* | 9/2011 | Honda | G06F 11/1068 711/103 |
| 2012/0096217 A1* | 4/2012 | Son | G06F 12/0246 711/103 |
| 2012/0297258 A1 | 11/2012 | Flynn et al. | |
| 2012/0303866 A1 | 11/2012 | Bandic | |
| 2014/0101369 A1 | 4/2014 | Tomlin et al. | |
| 2014/0136768 A1 | 5/2014 | Iglesia | |
| 2014/0195725 A1* | 7/2014 | Bennett | G06F 12/0246 711/103 |
| 2014/0325117 A1 | 10/2014 | Canepa et al. | |
| 2015/0178164 A1 | 6/2015 | Zhang | |
| 2017/0160987 A1 | 6/2017 | Royer | |
| 2017/0269992 A1* | 9/2017 | Bandic | G06F 11/1068 |
| 2018/0074708 A1 | 3/2018 | Gerhart | |
| 2018/0095680 A1 | 4/2018 | Peterson | |

OTHER PUBLICATIONS

Non-Final Office Action issued in corresponding U.S. Appl. No. 15/282,295 dated Jun. 11, 2018.
Non-Final Office Action issued in corresponding U.S. Appl. No. 15/282,310 dated Jun. 29, 2018.
Kang et al., "Object-based SCM: An Efficient Interface for Storage Class Memories", Storage Systems Research Center, University of California, Santa Cruz, pp. 1-12, 2011 IEEE.
Zhang et al., "De-indirection for Flash-based SSDs With Nameless Writes", Computer Sciences Department, University of Wisconsin-Madison, pp. 1-16.
International Preliminary Report on Patentability issued in related Application No. PCT/US2017/053763 dated Apr. 2, 2019.
Non-Final Office Action issued in corresponding U.S. Appl. No. 15/282,295 dated Apr. 5, 2019.
Notice of Allowance issued in corresponding U.S. Appl. No. 15/282,295 dated Sep. 16, 2019.
Non-Final Office Action issued in corresponding U.S. Appl. No. 15/282,310 dated Apr. 4, 2019.
Notice of Allowance issued in corresponding U.S. Appl. No. 15/282,310 dated Aug. 2, 2019.

* cited by examiner

GARBAGE COLLECTION IN SOLID STATE DRIVES

BACKGROUND

Computing environments are frequently supported by block-based storage. Such block-based storage is increasingly provided by solid state drives (SSDs). SSDs provide a block-style interface, making it easy to integrate these drives into systems that have traditionally relied on hard drives and other block storage devices. SSD drive manufacturers incorporate a controller which provides the block-style interface and which manages data storage and mapping. For example when a read or write request is received, it may include a logical block address associated with the request. The controller may determine a physical location on the SSD from where the data should be read, or to where the data should be written. The controller may also manage data storage on the SSD to improve the longevity of the device and manage other flash-specific functions. However, while the drive manufacturer may provide a controller that is suitable for the average customer, such controllers may not provide sufficient flexibility or customizability for all users and applications for which such drives may be deployed.

Data on flash-based drives, unlike magnetic and other media, cannot be overwritten. Instead, the part of the drive, which has been written on previously, has to be erased before data can be written to it again. Typically, the smallest unit of an SSD that can be erased is a physical block, which is larger than the smallest unit of an SSD that can be written, which is typically a page. Since an entire block is erased at a time, before the block can be erased, a determination needs to be made as to whether all data in the block can be deleted. For example, if all data on the block is invalid (that is, newer instances of the same LBAs exist elsewhere), then the block can be erased. However, if some of the data is still valid, it needs to be relocated before the block is erased or it will be lost. Garbage collection, or recycling, refers to this process of identifying valid and invalid data and relocating data as needed to erase blocks.

Garbage collection traditionally has been performed by reading an entire block being garbage collected to determine what data needs to be relocated. This can reduce performance experienced by an end user by increasing the numbers of reads and writes to the drive by the garbage collector. It may also reduce the longevity of the drive by contributing to write amplification.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the aforementioned and other deficiencies experienced in conventional approaches to managing solid state drives (SSDs) in a block-based storage service in an electronic environment. In particular, SSD management features may be decoupled from a built in SSD controller and implemented in an external controller. The SSD management features may include indirection mapping and replay. An indirection mapping data structure can maintain a mapping between logical block addresses used by a host computer and physical data storage locations on an SSD. Updates to the indirection mapping data structure can be stored in journals. One or more journals may be associated with a cluster block, such that the journals store updates to the indirection mapping data structure for that cluster block. In various embodiments, a cluster block may include a grouping of physical erase blocks across an array of N contiguous die. The grouping of physical erase blocks may include the same block index from each die to simplify translation from logical to physical erase blocks. In embodiments using multi-plane programming on a die, P consecutive blocks from each of the N die can be grouped into a single cluster block, where P is the number of planes supported by the NAND die. When a journal has reached a predefined limit, the journal can be stored to a predetermined location on the cluster block determined based on the number of entries stored by the journal. Such co-location at predetermined locations is referred to as spatially coupled journaling. A garbage collector can be tasked with keeping cluster blocks available for future write operations. During garbage collection the spatially coupled journals can be retrieved and used to determine whether the corresponding data is valid by comparing the mapping from the journal to the current mapping in the indirection mapping data structure. When the mapping matches, the data is valid and can be relocated by garbage collection. After all valid data has been relocated, the cluster block is ready to be erased, making it available for future writes.

Figure 1:
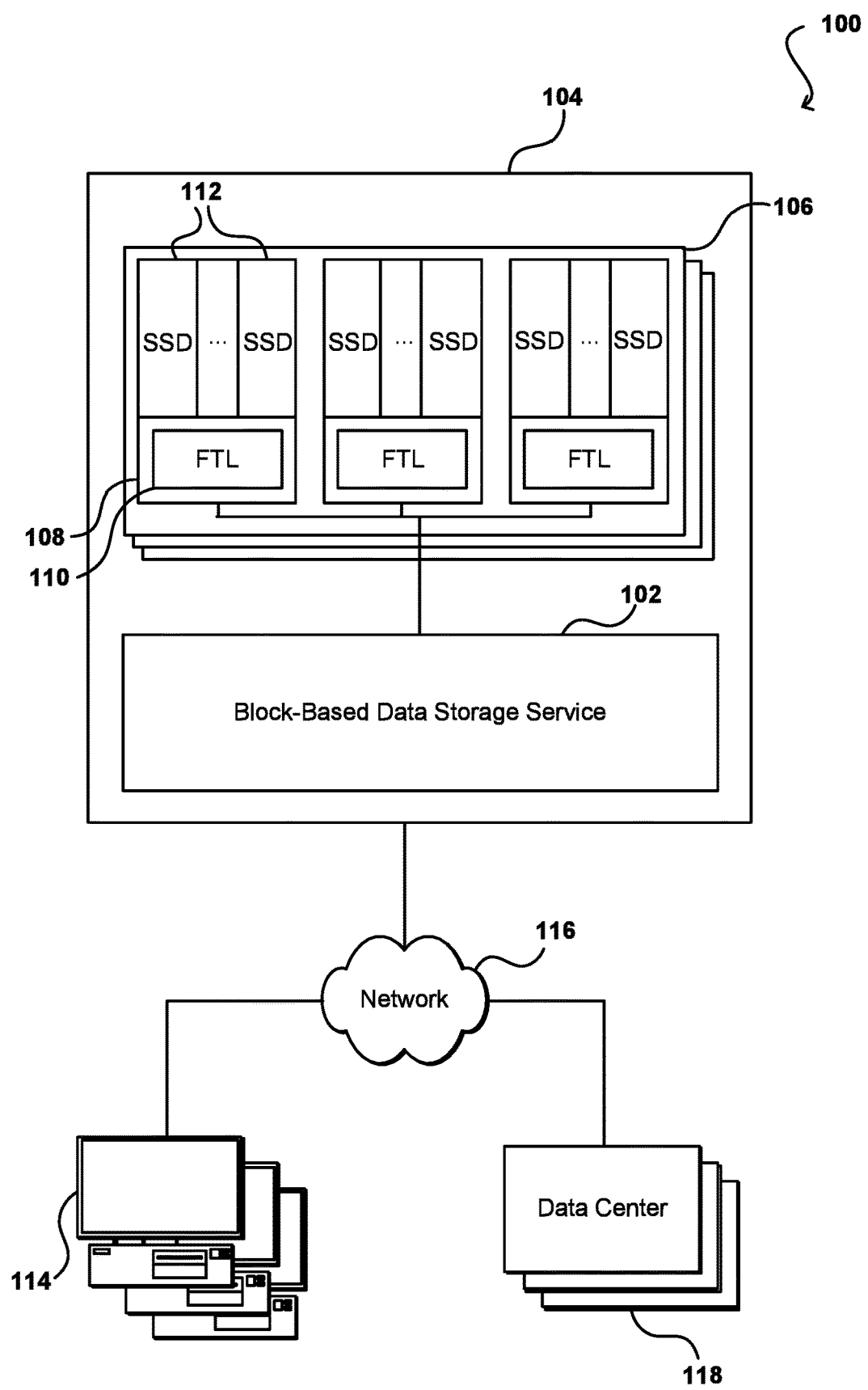
FIG. 1 illustrates an example environment in which aspects of various embodiments can be implemented.

FIG. 1 illustrates an example environment 100 in which aspects of various embodiments can be implemented. In this example configuration, a block-based data storage service 102 uses multiple block-based data storage systems in a data center 104 to provide reliable, non-local, block-based data storage to executing programs or various other components, systems, or services. Data center 102 includes a number of racks 104, each rack including a number of computing systems 106. The computing systems 106 on the illustrated rack 104 each can include a controller 108, including a flash translation layer (FTL) and one or more solid state drives (SSD) 110. Solid state drives typically include a controller that performs various management functions. However, in various embodiments, these functions are decoupled from the drive itself and provided by external controller 108. For example the flash translation layer of controller 108 may provide journaling, replay, and other indirection mapping management services, as discussed further below.

As shown in FIG. 1, a block-based data storage service 112 can provision block storage devices for one or more host computing systems 114, virtual machines, and/or other services. In some embodiments, block storage devices may be accessed over a network 116, including a local network and/or an external network (e.g., the Internet or another public data network). In some embodiments, the data center 104 can be connected via the network 116 to one or more other data centers 118 that each may include some or all of the computing systems and storage systems illustrated with respect to data center 104. The host computing systems 114 may be operated by various parties for various purposes, such as by the operator of the data center or third parties (e.g., customers of the block-based data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be thousands of computing systems per data center, with at least some of those computing systems being host computing systems that may each host one or more virtual machines, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

In various embodiments, the block-based storage service can expose the storage to the customers as a Web service. Customers can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects.

Traditional solid state drives (SSDs) include a controller that provides various drive and data management features. For example, SSDs store data persistently in flash cells; however data cannot be overwritten and instead must be first erased before new data can be stored. Additionally, each cell has a finite number of write/erase cycles before it can no longer reliably store data. As such, to effectively manage data storage, SSD-specific garbage collection, replay, and trim methods may be implemented by the SSD controller. As discussed above, these features are provided by drive manufacturers and may not be suitable for all users. Many of the features provided by the controller can be decoupled from the SSD in accordance with various embodiments.

Figure 2:
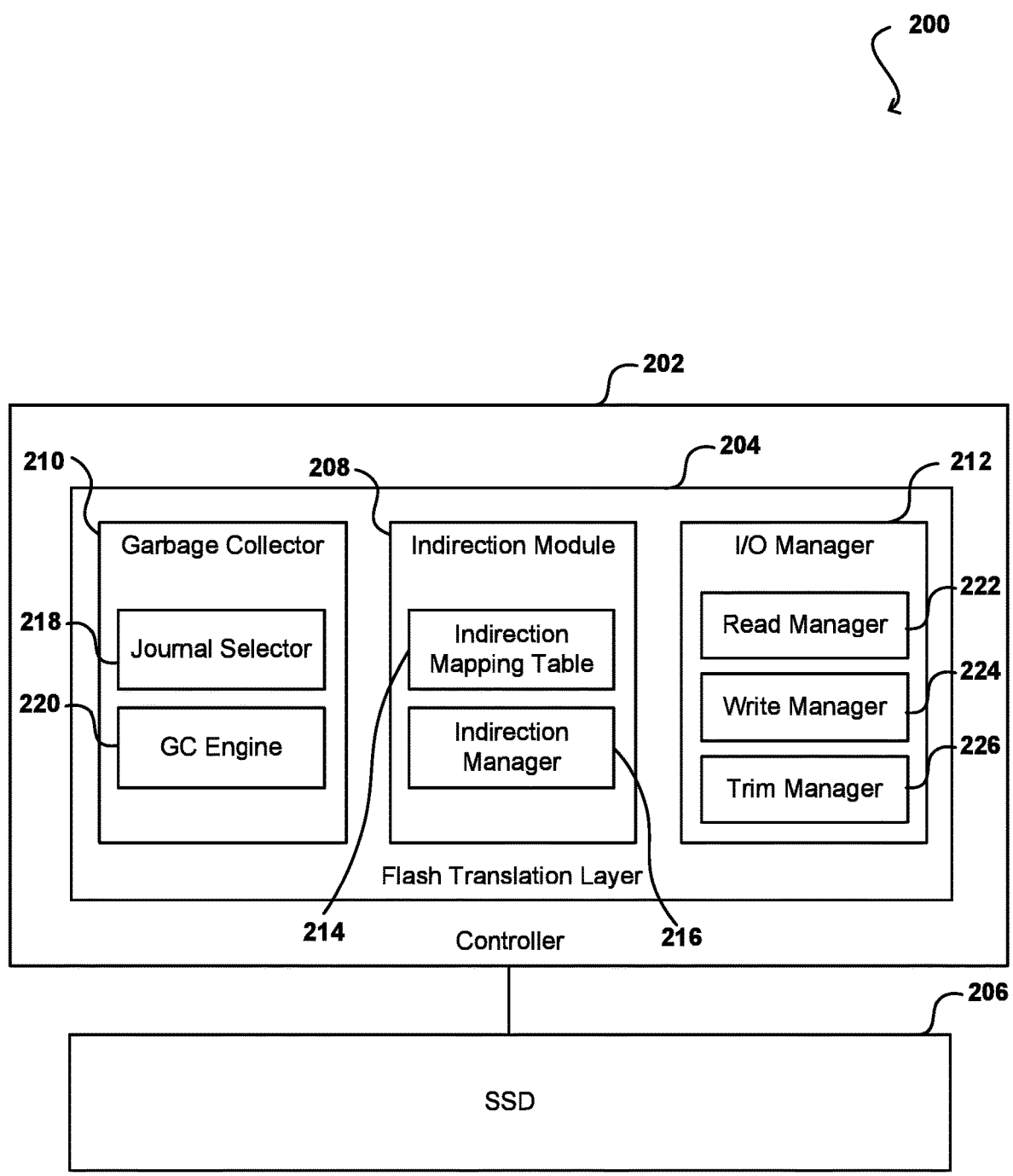
FIG. 2 illustrates block diagram of a flash translation layer for a solid state drive that can be utilized in accordance with various embodiments.

FIG. 2 illustrates block diagram 200 of a controller decoupled from a solid state drive that can be utilized in accordance with various embodiments. Controller 202 can include a flash translation layer (FTL) 204 which provides various data management features for a SSD 206. As shown in FIG. 2, FTL 204 can include indirection module 208, a garbage collector 210, and input/output manager 212. Many of these management features require locating where data is stored physically on the SSD. Indirection module 208 can manage these locations using an indirection mapping table 214 that maps logical block addresses which are used by a host computing system to the physical data locations on disk. These logical-to-physical mappings are described in indirection units stored in the indirection mapping table. An indirection manager 216 can enable indirection units in the indirection mapping table to be stored, modified, or updated. The indirection mapping table can be implemented as various data structures as would be known to one of ordinary skill in the art. In various embodiments, each indirection entry may represent multiple logically and contiguous data blocks.

Such indirection mapping tables can become quite large, increasing in size in proportion to the size of the SSD. The indirection mapping table may be maintained in volatile memory, such as RAM. This provides quick access to the mappings, but results in potential loss of the indirection mapping table in the event of a power failure or other unexpected power interruption. In various embodiments, and as discussed further below, a spatially coupled journaling scheme is implemented in which each time data is written to disk, a journal entry including logical address information. Based on the location of the journal entry, the corresponding physical location can be inferred. Each journal has a finite size, storing a maximum number of corresponding entries. In some embodiments all journals are of the same size. In some embodiments journals can be of variable size. Additionally, each physical chunk of media, whether defective or not, is journaled. By including a journal entry for every physical chunk of media, the journals can be stored at predetermined locations, regardless of the locations of defective blocks (e.g., bad blocks) on the disk. When the journal has reached a predefined limit, the journal is stored to the SSD within the same cluster block and immediately after the data it describes. As the journal includes a finite number of entries, corresponding to a known amount of disk space, and all physical media is journaled, the location of the journal on disk relative to the start of a cluster block (or the last journal storage location) is known deterministically. This journaling technique is referred to herein as being "physical media aware." A physical media aware journal describes both logical and physical details of a storage medium, including bad blocks on the medium.

As discussed, a flash block must be in an erased state before data can be stored to it (e.g., data cannot be overwritten to the same physical location unless it is first erased). To accommodate these characteristics, data can be written sequentially to the next available page. When new data is written and associated with the same logical address as previously written data, the previously written data is invalidated. Garbage collector 210 can ensure erased cluster blocks are available to store data, and to reduce data fragmentation. Garbage collector 210 can include a journal selector 218 that can retrieve journals from the predetermined locations and determine whether the data is valid. Garbage collection engine 220 can then relocate data as needed or ignore the data, leading to it being erased when the cluster block is erased. Input/output manager 212 can manage read and write access to the SSD 206. In various embodiments, read manager 222 and write manager 224 may include read and write caches that store data requested to be read or written. In various embodiments, a trim manager 226 can enable a client device to indicate a range of logical addresses that are stale and can be discarded. By enabling ranges of logical addresses to be marked stale by the client, garbage collection overhead can be reduced.

Figure 3:
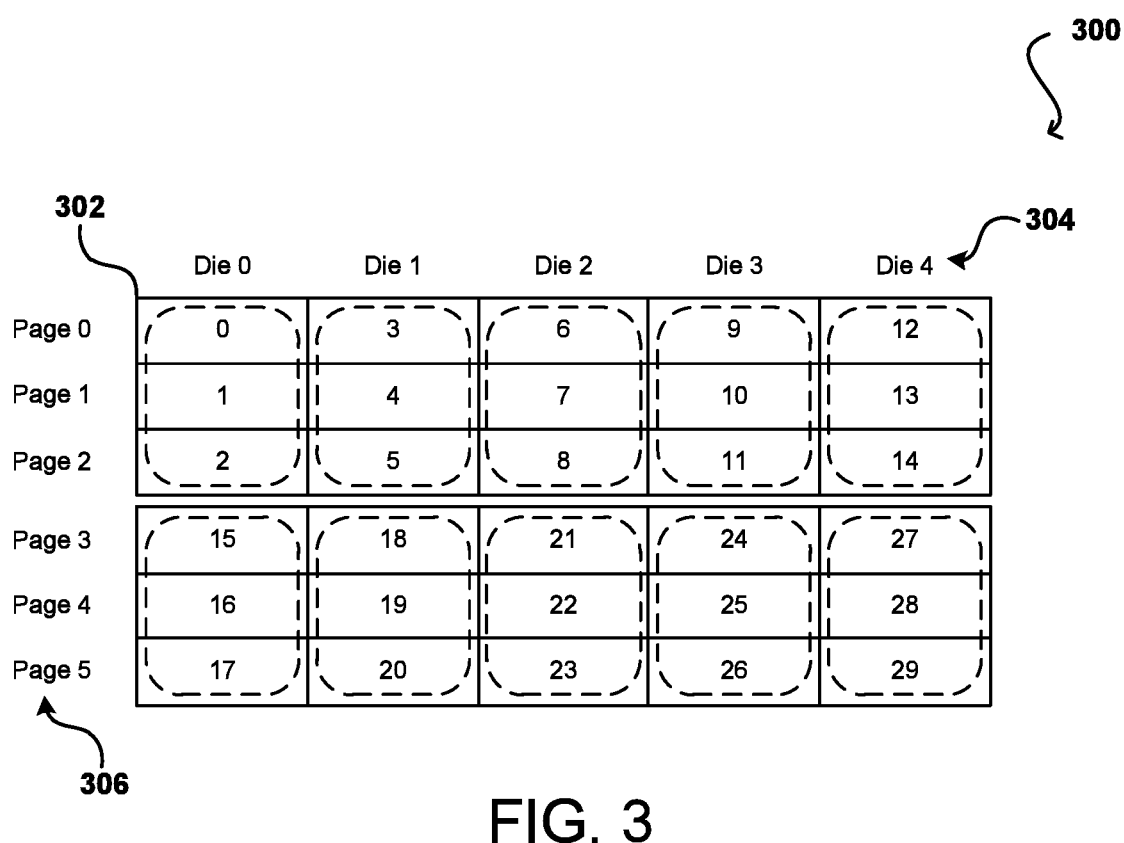
FIG. 3 illustrates a diagram of a flash array in accordance with various embodiments.

FIG. 3 illustrates a diagram 300 of a flash array in accordance with various embodiments. Cluster block 302 represents a grouping of contiguous die 304 on an SSD. This grouping may include physical erase blocks across an array of N contiguous die. The grouping of physical erase blocks may include the same block index from each die to simplify translation from logical to physical erase blocks. In embodiments using multi-plane programming on a die, P consecutive blocks from each of the N die can be grouped into a single cluster block, where P is the number of planes supported by the NAND die. When data is stored to disk, it is stored on one or more pages 306 of the cluster block 302. Although the example cluster block 302 shown in FIG. 3 includes five die 302 and six pages 304, alternative configurations may also be used. Additionally, cluster blocks may be variable in length. In this example, each dashed box represents the amount of physical space on the SSD that is written during a write operation. Each number inside each dashed box indicates an ordering in which indirection units are laid out on the cluster block. As data is written to the cluster block, corresponding entries are stored in a journal, with each entry corresponding to an indirection unit in the order shown. This example is continued in FIG. 4.

Figure 4:
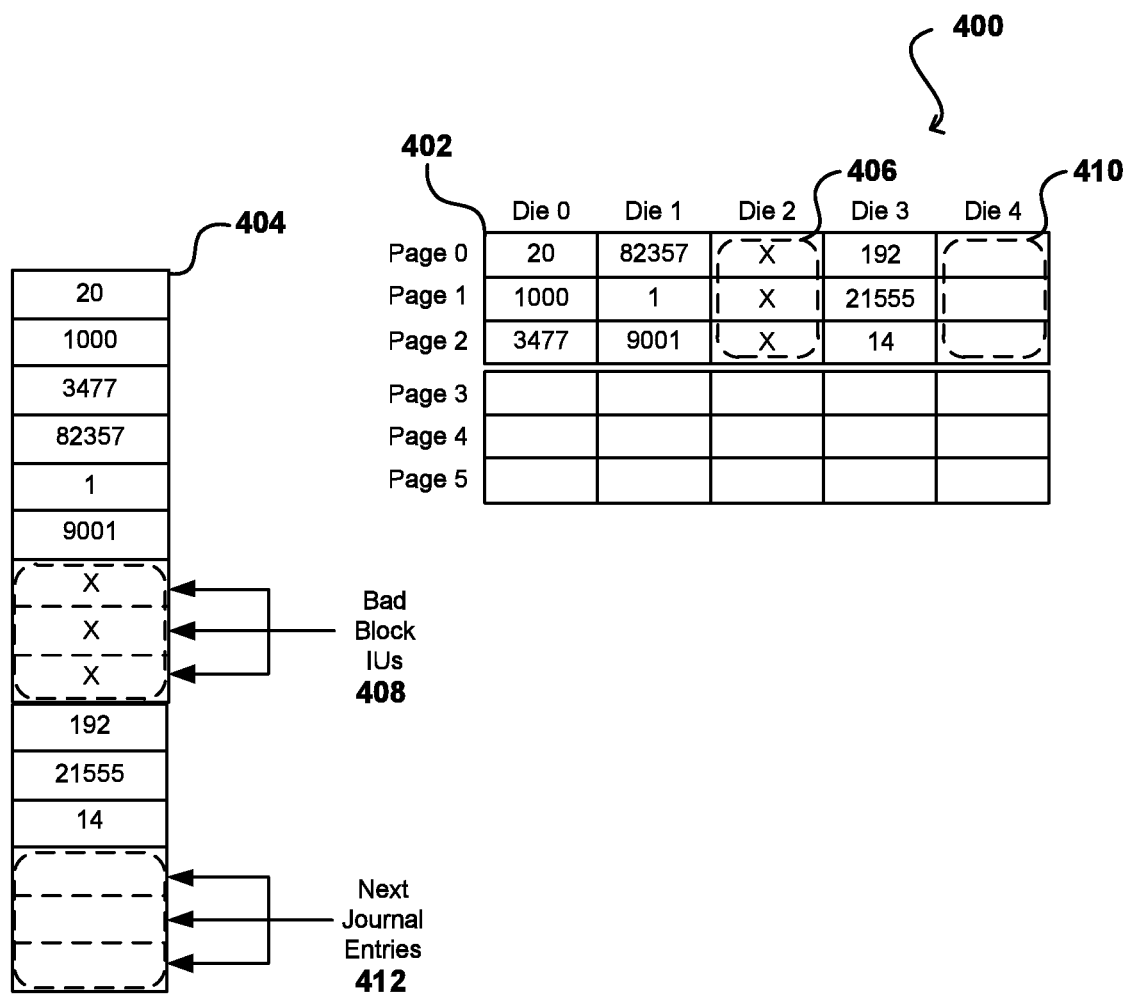
FIG. 4 illustrates a journal and flash array in accordance with various embodiments.

FIG. 4 illustrates a diagram 400 of a journal and flash array in accordance with various embodiments. As shown in FIG. 4, cluster block 402 stores data corresponding to logical block addresses. Journal 404 can be maintained in RAM and include the logical block addresses for data stored in the cluster block. The journal can be updated in the same order as data is written to disk. As shown above with respect to FIG. 3, data is written to disk in a particular order. For example, the first three entries of journal 404 correspond to die 0, pages 0-3, reflecting the order in which the data was written. By updating the journal in the same order, each entry in the journal corresponds to a known location on the disk. The journal includes entries for each physical portion of media, even if that portion is not written to, e.g., including defective or skipped blocks, such that the journal remains synchronized with the data on disk. For example, as shown in FIG. 4, dashed box 406 includes defective blocks indicated as having value X. These defective blocks, also referred to as bad blocks, may be identified using a bad block table (also known as a bad block map or bad block mapping structure), or through detection of an error during writing or during a subsequent read of the defective location. The journal 404 includes entries for every portion of physical disk, including the defective blocks, shown in journal entries 408. As discussed further below, this enables the spatially coupled journals to be used not only to rebuild the indirection map, but also to rebuild a bad block table on demand. Additionally, it allows the garbage collection module to make decisions regarding media validity without consulting a bad block mapping structure to determine absolute physical location. As shown in FIG. 4, following defective blocks, the journal 404 may continue to include entries in order, as described above. For example, dashed box 410 indicates the next portion of disk to be written which corresponds to the next three entries 412 of journal 404.

In some embodiments, each journal 404 can be the same size. Once the journal has filled all of its entries, it can be stored to cluster block 402. For example, the size of the journal can be made equal to the size of an indirection unit such that the journal can be written in a single write operation and the next journal can include entries starting with the next indirection unit. Since each journal is stored at a predetermined location, each journal includes entries that map a fixed amount of physical media to logical units. Where these logical units are of fixed size, each journal has a fixed number of journal entries. If the logical units are of variable sizes, e.g., where compression is used, journals are still stored at predetermined locations. To enable the journals to be stored at the predetermined locations, each journal may include a variable number of entries. When entries corresponding to the fixed amount of physical disk space have been journaled, the journal can be closed and stored at the predetermined location. In this example, each journal may include a different number of journal entries, but will be stored at predetermined locations and cover a fixed amount of physical disk space.

Figure 5:
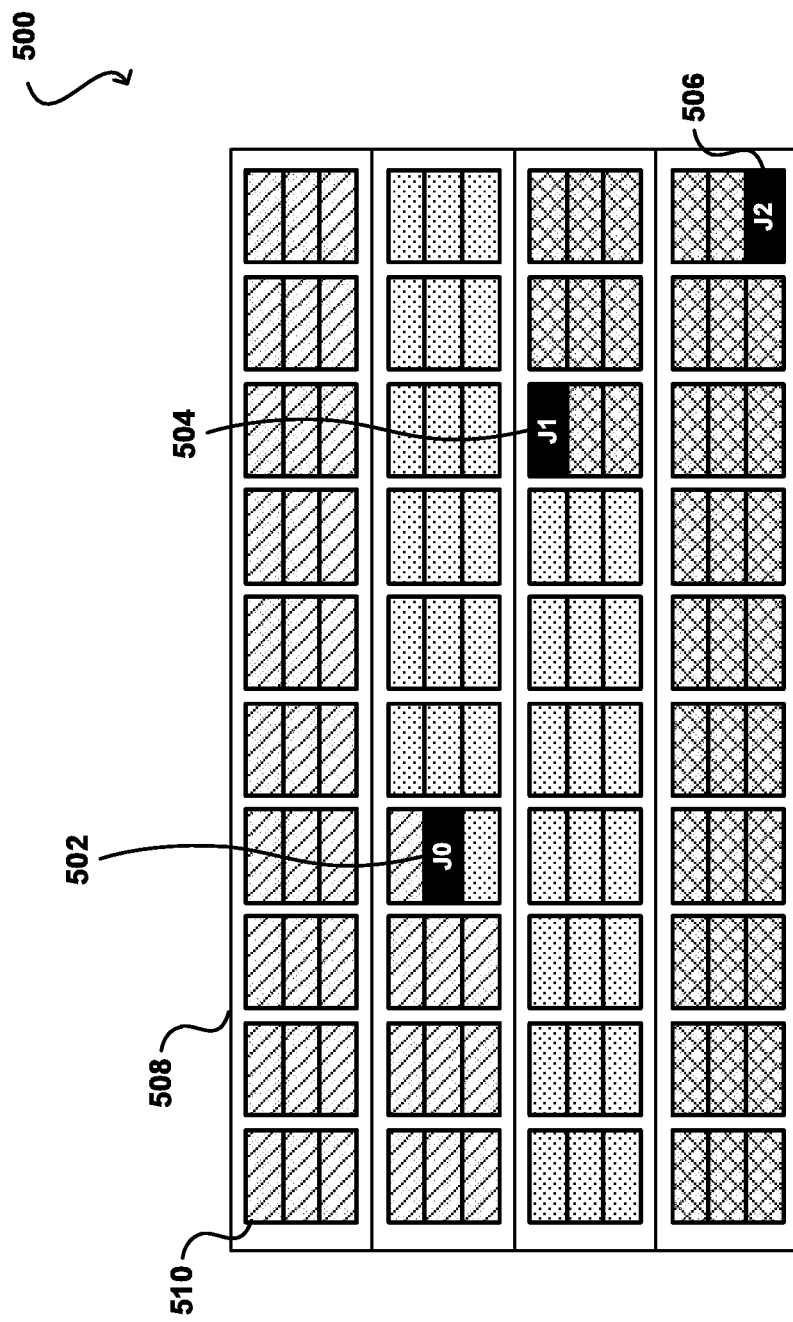
FIG. 5 illustrates physical media aware spatially coupled journals in accordance with various embodiments.

FIG. 5 illustrates a diagram 500 of physical media aware spatially coupled journals in accordance with various embodiments. As described above, a journal can be stored to disk in the same cluster block in-line with the data described in the journal. This is referred to as spatially coupled, as the journal and data are co-located. Additionally, because data is stored to disk in a particular order, each physical chunk of media is journaled including bad blocks, and the journals are of finite size, each journal is stored at a physical location on disk that is known deterministically from the start of a cluster block. In some embodiments, a journal can be stored upon detection of a journal storage event. As discussed, one example of a journal storage event is determining that the journal is full. When the journal is determined to be full, it can be saved to the next physical location on the cluster block. As shown in FIG. 5, multiple journals 502, 504, 506 can be spatially coupled to cluster block 508, each journal including indirection entries for data stored in the cluster block for indirection units before the journal but after any earlier stored journal. For example, journal 502 can include indirection entries for indirection units starting at the beginning 510 of cluster block 508 until the indirection unit immediately before journal 502. Similarly, journal 504 can include indirection entries for indirection units after journal 502 and immediately before journal 504.

As shown in this example, each journal is stored at a physical location that is known deterministically from the beginning of the cluster block, based on the size of the journal. For example, each journal in FIG. 5 stores 40 indirection entries, and is stored in the next indirection unit. To ensure the journals are stored at predetermined locations, a write placement manager can be configured to store the journal immediately upon detection of a journal storage event into the next indirection unit. Additionally, each journal is tied to a specific cluster block. As such, a journal that includes indirection units for a cluster block is stored in that cluster block. This may result in journals being closed before they are full. As such, another example of a journal storage event is determining that the cluster block is nearly full (e.g., has one, or other configurable number, remaining indirection unit). As shown in FIG. 5, journal 506 is closed at the end of the cluster block having one fewer entry than journals 502 or 504. Although the example of FIG. 5 shows journals having a small number of journal entries, this is for simplicity of depiction and explanation. In various embodiments, journals having more or fewer entries may be used.

For example, if a journal is sized to match a 32 KiB indirection unit, each journal entry is 32 bits, and each journal includes a 20 byte header, the journal can include approximately 8,000 journal entries before being stored to disk. Such a journaling scheme enables a single 32 KiB journal to include indirection entries for approximately 256 MiB of data.

In some embodiments, the predetermined location where a journal is to be stored on the physical media may be defective (e.g., as of media production or due to use or other factor). In some embodiments, N contiguous locations on the physical media may be predetermined for each journal, where N can be defined to be any integer. For example, a predetermined location for a journal may correspond to 2 predetermined contiguous pages on an SSD. Although this increases the amount of space on the physical media dedicated to the journals, it provides layers of redundancy to ensure the fixed-location journaling scheme can still be used if one of the predetermined locations is defective. In some embodiments, defective locations can be remapped to non-defective locations logically. For example, a map of defective blocks mapped to journal locations can be maintained and remapped during device initialization to one or more non-defective locations. This remapping can be done by the SSD firmware or at the flash device level (if supported).

In some embodiments, where the number of dies in a cluster block is equal to or greater than the number of journals used in a cluster block, each journal can be stored to a different die. For example, as shown in FIG. 5, each journal 502, 504, 506 is stored to a different die. If a physical block in the cluster block exhibits a failure only a single journal is affected. To ensure journals are staggered across different dies, each journal can include a variable number of journal entries. Because the entire physical media is journaled, the number of journal entries can be predefined so that when full each journal is stored to a different die.

In some embodiments, if the number of dies in a cluster block is equal to or greater than double the number of journals used in a cluster block, then each journal can be duplicated and stored to a different die. If any die fails, no journals will be lost, as the corresponding copy can be recovered from its location on another die. Additionally, or alternatively, redundant array of independent disks (RAID) can be used to provide additional protection to the journals. For example, RAID 5 parity can be accumulated across all journals in the cluster block and saved for recovery in the event of a read failure on a journal.

Embodiments described above assume that each indirection entry corresponds to a fixed amount of disk space such that after a particular number of entries (e.g., the size of the journal) the journal is stored at a predetermined location. However, where compression algorithms are used, each entry may not correspond to the same amount of disk space. As such, if the journal is of fixed size and it is stored when it is filled, it may not be stored at a predetermined location. In some embodiments, a variable sized journal may be used that can be stored to disk upon detection that data has been written up to a predetermined location. For example, a write placement manager can keep track of write locations and cause the journal to be written to disk at a predetermined location. The journal can be closed and written to disk at the predetermined location regardless of the size of the journal, such that it can be later recovered from the predetermined location.

In some embodiments, because each journal is stored at a predetermined location, techniques may be used to reduce the likelihood of a defect at one of these locations. For example, some SSDs may be written in a single level cell (SLC) mode, where each cell stores a single bit of data, or a higher density storage mode such as multi-level cell (MLC) mode or triple level cell (TLC) mode where two bits or three bits, respectively may be stored per cell. SLC mode enables less data to be stored than MLC or TLC mode, but that data is stored more reliably. Accordingly, in some embodiments, user data may be stored to disk in MLC or TLC mode to maximize storage density. When a journal is stored in-line with the user data as discussed herein, it can be stored in SLC mode. This reduces the likelihood of a defect at the predetermined locations where the journals are stored, making the journals more robust. For example, journals 502, 504, 506, may be written in SLC mode, while all other indirection units shown in FIG. 5 may be written in TLC mode.

Figure 6:
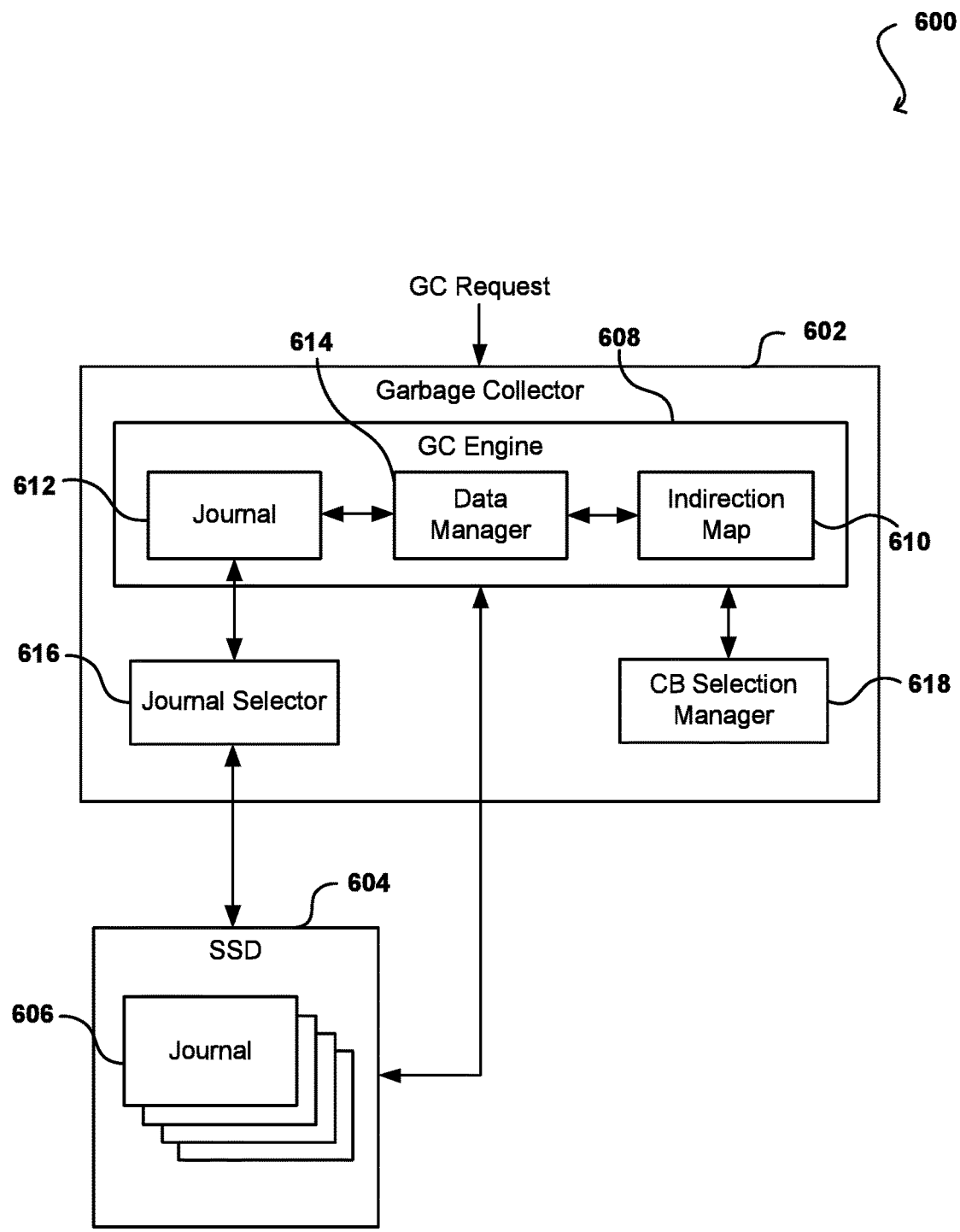
FIG. 6 illustrates a block diagram of a garbage collector that can be utilized in accordance with various embodiments.

FIG. 6 illustrates a block diagram 600 of a garbage collector that can be utilized in accordance with various embodiments. As shown in FIG. 6, garbage collector 602 can manage garbage collection for one or more SSDs 604 having one or more spatially coupled journals 606 stored thereon. As discussed above with respect to FIG. 2, garbage collector 602 can be implemented as part of a flash translation layer of a controller that has decoupled various SSD management functions from the SSD.

SSDs, unlike magnetic media, must be erased before new data can be written to the drive. Therefore, garbage collection ensures that there is disk space available to be written to. Additionally, the smallest portion of an SSD that can be erased is a block, ranging from hundreds of kilobytes to several megabytes, while the smallest portion of an SSD which may be written is a page. As such, a block may include a mix of valid and invalid user data. In some embodiments, valid user data may be stored at a physical location that corresponds to that stored in the indirection map, while invalid user data may be stored at a different physical location than that stored in the indirection map. Garbage collection engine 608 can provide cluster blocks ready for writing more efficiently using spatially coupled journals to determine valid and invalid user data and move the valid data to a new cluster block.

Embodiments utilize physical media-ware spatially coupled journals to determine whether data is valid without having to maintain a separate data structure or additional processing to identify which data is stored on which physical block. Accordingly, garbage collection engine 608 can compare data from indirection map 610 to that stored in a spatially coupled journal 612 to determine whether data is valid. This way, the garbage collector 602 does not have to read the entire block being garbage collected, but instead may just read the spatially coupled journals from the block. Since the spatially coupled journals 606 are located at known locations on the block, the journals can be retrieved efficiently, without having to scan the entire block to identify journals or consult another data structure that tracks journal or bad block locations (e.g., a bad block map). Additionally, because a journal can include entries for several thousand indirection units, valid and invalid data for an entire block can be determined by reading several journals, rather than reading the entire block, reducing overhead associated with garbage collection.

As shown in the example of FIG. 6, a data manager 614 can compare data from indirection map 610 to a journal 612 to identify valid data. For example, journal selector 616 can retrieve a journal from a cluster block on SSD 604. In some embodiments, journal selector 616 can retrieve all journals from the cluster block on SSD 604 or may retrieve the journals sequentially. As discussed above, data is written to the cluster block in a known order, with indirection entries added to a spatially coupled journal in the same order. Additionally, each journal may include a particular number of entries before it is written to disk. Accordingly, the location of each journal on disk, relative to the start of the cluster block or previous journal, is known deterministically. Also, the physical location on disk corresponding to each entry in the journal is known deterministically.

In accordance with an embodiment, data manager 614 can parse journal 612. For each entry in journal 612, data manager 614 can determine the logical block address (LBA) identified by the entry and determine a physical location on disk corresponding to the entry. Data manager 612 can then lookup the LBA in indirection map 610 and read the corresponding physical location. If the physical location determined based on journal 612 matches the physical location from the indirection map 610 then the data is valid, if the physical locations do not match then the data is invalid. In some embodiments, valid data may be relocated to a new cluster block. Data manager 614 can add the valid data to a write buffer to which additional data to be migrated is added. When the write buffer is full, the data can be written to a new block on SSD 604. At some point after all valid data has been relocated, the cluster block can be erased and made available for future writes. In some embodiments, when new data is written to disk associated with a logical block address, invalidating the previous data that was associated with that LBA, the indirection map can be updated to reflect the new association, and that change journaled in the spatially coupled journal associated with that portion of the cluster block.

In some embodiments, a cluster block selection manager 618 can identify a cluster block to be garbage collected. The cluster block selection manager 618 can determine the cluster block to be garbage collected based on, e.g., an amount of recoverable space on the cluster block. A cluster block with more invalidated indirection units has more recoverable space, and therefore may be a better candidate for garbage collection. In some embodiments, cluster block selection manager 618 can compare the number of invalidated indirection units and valid indirection units to one or more threshold numbers to determine whether to garbage collect the cluster block. In some embodiments, once garbage collection of a cluster block begins, a next cluster block to be garbage collected can be identified. In some embodiments, cluster block selection manager 618 can select one or more cluster blocks to be garbage collected. This selection can be configured to ensure a particular number of cluster blocks are available to be written to at any given time.

As discussed, each spatially coupled journal includes indirection entries mapping a logical block address to a physical locations on disk that stores user data. Additionally, the spatially coupled journals may include entries indicating that a physical location on disk cannot be written to due to wear on the flash cells or other disk error (e.g., a bad block). Accordingly, because the spatially coupled journals are inherently defect aware, separate reads to a bad block table or other defect data structure are not required to determine the physical location of an indirection entry in the journal. When a defect is identified in the journal, the location can be skipped without confirming the defect in a defect map or other data structure, and the next entry in the journal can be parsed. Reducing reads to a defect map during garbage collection reduces the bandwidth used during garbage collection and provides more consistent service to the host computer.

Figure 7:
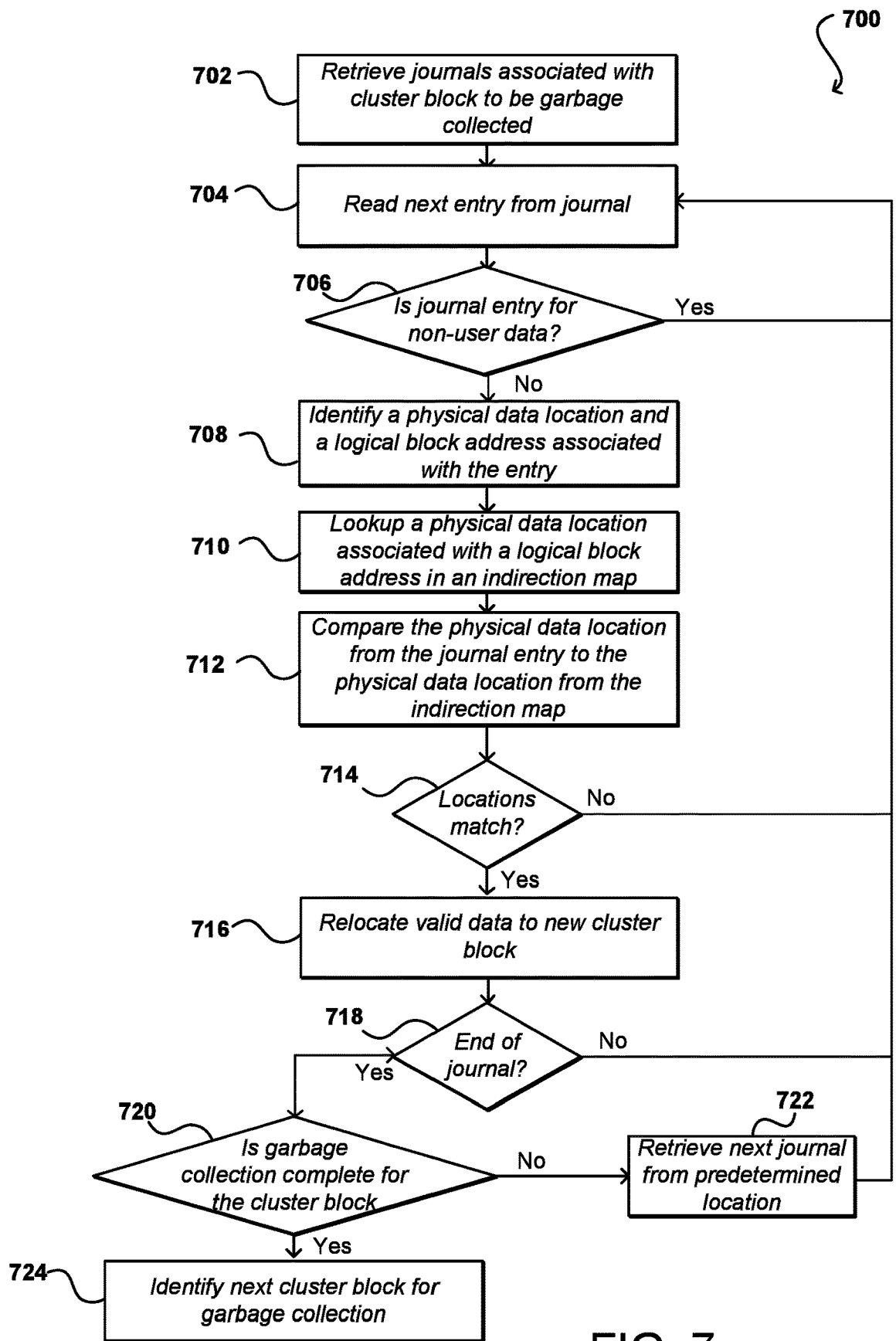
FIG. 7 illustrates a block diagram of a method of garbage collection using physical media aware spatially coupled journaling that can be utilized in accordance with various embodiments.

FIG. 7 illustrates a block diagram 700 of a method of garbage collection using spatially coupled journaling that can be utilized in accordance with various embodiments. As shown in FIG. 7, spatially coupled journals for a cluster block on a solid state drive (SSD) can be retrieved 702. As discussed, once a cluster block has been selected for garbage collection, the first journal in the cluster block can be retrieved from a predetermined location. The predetermined location can be determined based on the number of entries of the journal and the size of the data corresponding to each entry. In some embodiments, all journals associated with the cluster block can be retrieved at the start of garbage collection and processed in sequence. As the journals are written to disk in the order in which they are filled, and all data written to the cluster block is written in a particular order, the journals can be processed in the sequence in which they are written to disk.

Each journal can be parsed into a plurality of indirection entries. The next journal entry can be read 704. If the journal entry includes 706 a signature associated with non-user data, then that entry can be ignored and processing can return to 704 and the next journal entry can be read. For example, a journal entry may include an address that is invalid for storing user data as a signature indicating that the data is invalid. In some embodiments, the entry may include a bad block signature that indicates that the physical location is defective. The signature may include a bad block flag (e.g., a one bit signature) or may include other data indicating that the physical data location is defective. In some embodiments, where a bad block is identified, the physical data address associated with the entry can be used to verify a bad block table. For example, it can be determined whether the bad block table includes the associated physical data address. If the bad block table does not include the physical data address, one or more diagnostics can be performed (or scheduled to be performed) on the block to determine whether it can be recovered. If the physical data location is defective, the bad block table can be updated to include the physical data location.

If the journal entry is not for non-user data, a logical block address associated with an indirection entry can be identified 708. Using the logical block address associated with the indirection entry, the physical location associated with the entry can be looked-up in the indirection mapping table 710. For example, each entry in the journal corresponds to an indirection unit of a particular size, and each indirection unit is associated with an entry, even in the case of defects. As discussed, the indirection mapping table can include a plurality of indirection entries that map physical data locations on the SSD to logical addresses used by a host computer. The logical block address associated with the journal entry can be used to lookup the corresponding indirection entry in the indirection map to determine a physical data location from the indirection map. The physical location associated with the journal entry can be compared 712 to the physical location from the indirection entry.

If the physical location from the journal entry matches 714 the physical location from the indirection map, the data can be identified as valid and can be relocated 716 to a new cluster block. If the physical locations do not match, the data can be determined to be invalid and ignored. Since this data is no longer valid, it can be erased when the cluster block is erased and no additional processing of this data (such as marking the data invalid) is needed. It may then be determined whether the end of the journal has been reached 718. If not, processing can return to 704 and the next entry can be read. This process can continue until all entries in the journal have been processed and the associated data identified as valid or invalid. In some embodiments, data being relocated to a new cluster block can be added to a write buffer. Once the write buffer is full, the data can be written to the new cluster block.

If the end of the journal has been reached it can be determined whether garbage collection of the cluster block has been completed 720. If more journals remain, the next journal can be retrieved 722 from its predetermined location and processing can return to 704. The next journal can be identified based on the journal's physical location on the cluster block relative to the most recently processed journal. In some embodiments, the next journal can be retrieved from the next predetermined location in the cluster block. In some embodiments, each journal may include a sequence number in a header that can be used to order the journals for processing. If all journals for the cluster block have been processed, the cluster block can be garbage collected. This may include erasing the cluster block such that it can be rewritten to. In some embodiments, a cluster block sequence number or identifier can be added to an available cluster block pool such that it is available for future write operations. Once the cluster block has been garbage collected, a next cluster block candidate for garbage collection can be identified 724.

As discussed, journals can be staggered across different dies. For example, the number of entries in a journal can be variable such that when the journal is stored, it is stored to a different die than other journals. In some embodiments, if there are more than double the number of dies than journals, duplicates of each journal can also be stored to different dies. In some embodiments, cluster blocks can be organized into cluster block groups. Within each cluster block group, the journals for each cluster block can be stored to different dies. Storing the journals to different dies enables multiple cluster blocks within the cluster block group to be garbage collected in parallel without journal reads targeting the same dies, improving garbage collection performance and reducing overhead. For example, cluster block M can have journals stored on dies A and a second cluster block N can have journals stored on dies B, where A and B each define a different set of dies. In this example, no die from set A includes a journal from both cluster blocks M and N (e.g., if a die in set A includes a journal for cluster block M, it does not also include a journal for cluster block N). If cluster blocks M and N are garbage collected simultaneously, journal reads will always be to different dies making simultaneous reads more efficient.

Although embodiments are discussed above with respect to parsing each journal in the order in which it was written, because journal entries are included for all of the physical media (e.g., including non-user data such as bad blocks, system data, or pad), the journal entries may also be parsed in reverse order. This enables a cluster block to be garbage collected from the end, accelerating garbage collection, depending on the data that is stored thereon. Where data is being written in a repetitive pattern into the cluster block, the only valid indirection units are at the end of the cluster block. For example, if indirection units 0, 1, and 2 are written repetitively, the last three copies of these indirection units on the cluster block will be valid, and all other copies will be invalid. Starting garbage collection from the beginning of the cluster block would require all of the invalid copies to be processed before identifying the valid copies. By performing garbage collection from the end of the cluster block, the valid copies can be quickly identified, and any other copies of these indirection units can be ignored, reducing garbage collection time.

Figure 8:
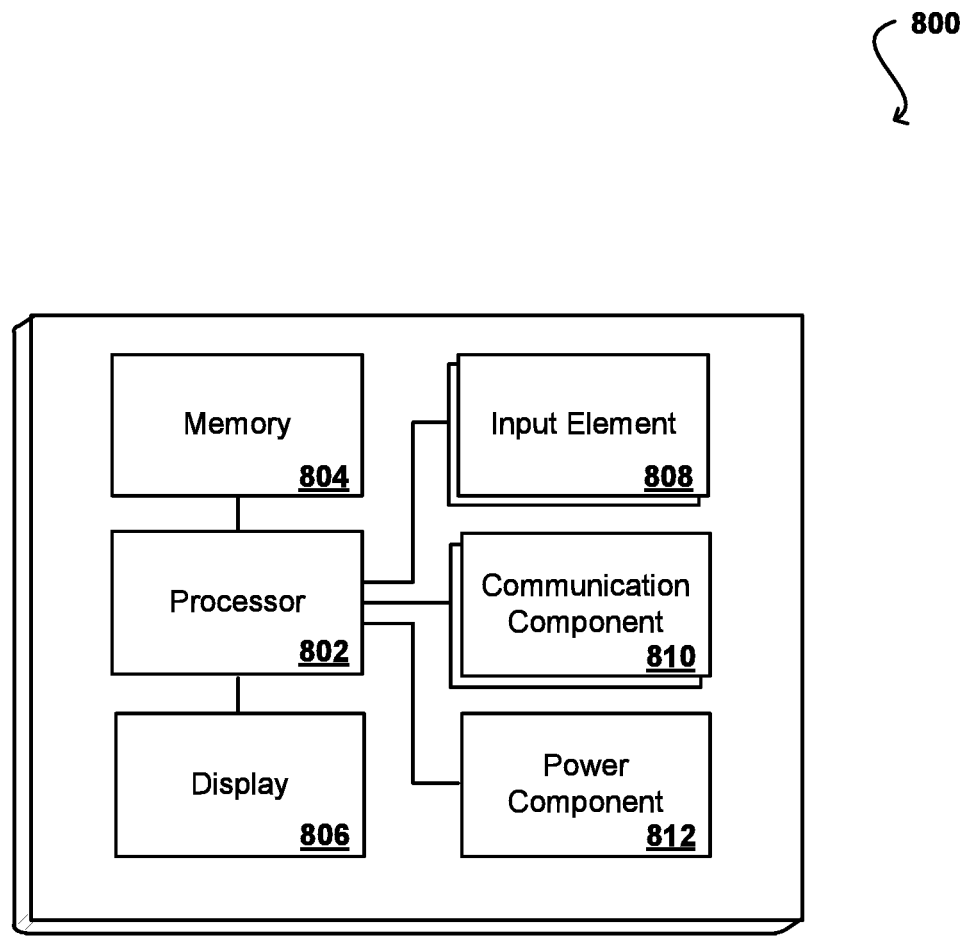
FIG. 8 illustrates components of an example computing device that can be used to perform aspects of the various embodiments.

FIG. 8 illustrates a logical arrangement of a set of general components of an example computing device that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device may include some type of display element 806, such as a touch screen or liquid crystal display (LCD), although devices such as portable media players might convey information via other means, such as through audio speakers. In some embodiments, the computing device 800 can include one or more networking and/or communication elements 808, such as a Wi-Fi, Bluetooth, RF, wired, or wireless communication system. The device in many embodiments can communicate with a network, such as the Internet, and may be able to communicate with other such devices. In some embodiments the device can include at least one additional input component 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 812, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
retrieving a plurality of journals from predetermined locations in a first portion of a solid state drive (SSD), wherein the plurality of journals and physical data locations on the SSD are both located in a cluster block, with the plurality of journals comprising a first journal entry that maps to a first physical data location and a second journal entry that maps to a second physical data location, wherein each journal of the plurality of journals including indirection entries of data stored in the cluster block for indirection units located before the journal but after any earlier stored journal;
determining first location data associated with the first journal entry, the first location data including a logical address and the first physical data location;

determining from the second journal entry that the second physical data location is defective by use of a separate bad block map and will not be copied to a second portion of the SSD;

determining third location data from an indirection mapping data structure using the logical address, the third location data including a third physical data location;

determining that the first physical data location and the third physical data location match; and storing data stored at the first physical data location to the second portion of the SSD.

2. The computer-implemented method of claim 1, further comprising:

determining that all journal entries have been parsed in the first journal;

determining a next journal of the plurality of journals from the first portion of the SSD; and identifying a journal entry associated with the next journal, the journal entry associated with valid data.

3. The computer-implemented method of claim 1, wherein each journal from the plurality of journals is stored on a different die of the SSD.

4. The computer-implemented method of claim 2, wherein each journal from the plurality of journals includes a variable number of entries based on a corresponding predetermined storage location.

5. The computer-implemented method of claim 3, further comprising:

grouping a plurality of portions of the SSD, wherein each of the plurality of portions has a respective set of journals, and wherein each journal from each of the plurality of sets of journals is stored on a different die of the SSD; and performing garbage collection of the plurality of portions of the SSD simultaneously.

6. The computer-implemented method of claim 1, further comprising:

identifying a next journal entry from the first journal;

determining fourth location data associated with the next journal entry, the fourth location data including a fourth physical data location;

determining fifth location data from the indirection mapping data structure based on the next journal entry, the fifth location data including a fifth physical data location;

determining that the fourth physical data location data does not match the fifth physical data location data; and ignoring the fourth physical data location.

7. The computer-implemented method of claim 1, further comprising:

verifying that a corresponding entry for the second physical data location exists in a bad block table.

8. A system, comprising:

at least one processor; and memory including instructions that, when executed by the at least one processor, cause the system to:

retrieve a plurality of journals from a plurality of predetermined locations in a first portion of a solid state drive (SSD), wherein the plurality of journals and physical data locations on the SSD are both located in a cluster block, with the plurality of journals comprising a first journal entry that maps to a first physical data location and a second journal entry that maps to a second physical data location, wherein each journal of the plurality of journals including indirection entries of data stored in the cluster block for indirection units located before the journal but after any earlier stored journal;

determine first location data associated with the first journal entry in a first journal, the first location data including a logical address and the first physical data location;

determine from the second journal entry that the second physical data location is defective by use of a separate bad block map and will not be copied to a second portion of the SSD;

determine third location data from an indirection mapping data structure using the logical address, the third location data including a third physical data location;

determine that the first physical data location and the third physical data location match; and store data stored at the first physical data location to the second portion of the SSD.

9. The system of claim 8, wherein the instructions further cause the system to:

determine that all journal entries have been parsed in the first journal;

determine a next journal of the plurality of journals from the first portion of the SSD; and identify at least one journal entry associated with the next journal, the at least one journal entry associated with valid data.

10. The system of claim 8, wherein each journal from the plurality of journals is stored on a different die of the SSD.

11. The system of claim 10, wherein each journal from the plurality of journals includes a variable number of entries based on a corresponding predetermined storage location.

12. The system of claim 10, wherein the instructions further cause the system to:

group a plurality of portions of the SSD, wherein each of the plurality of portions has a respective set of journals, and wherein each journal from each of the plurality of sets of journals is stored on a different die of the SSD; and perform garbage collection of the plurality of portions of the SSD simultaneously.

13. The system of claim 8, wherein the instructions further cause the system to:

identify a next journal entry;

determine fourth location data associated with the next journal entry, the fourth location data including a fourth physical data location;

determine fifth location data from the indirection mapping data structure based on the next journal entry, the fifth location data including a fifth physical data location;

determine that the fourth physical data location data does not match the fifth physical data location data; and ignore the fourth physical data location.

14. The system of claim 8, wherein the instructions further cause the system to:

verify that a corresponding entry for the second physical data location exists in a bad block table.

15. A computer-implemented method, comprising:

storing an indirection mapping table for a solid state drive (SSD) in memory, the indirection mapping table including a plurality of indirection entries that map physical data locations on the SSD to logical addresses used by a host computer;

storing a plurality of journals to predetermined locations in a cluster block on the SSD, wherein the plurality of journals and the physical data locations are both located in the cluster block, with a first journal from the plurality of journals including a first journal entry that maps a first physical data location in the cluster block to a first logical address and a second journal entry that identifies a second physical data location in the cluster block as defective by referring to a separate bad block map, wherein each journal of the plurality of journals including indirection entries of data stored in the cluster block for indirection units located before the journal but after any earlier stored journal;

receiving a request to perform garbage collection on the cluster block;

retrieving the first journal entry and the second journal entry from one of the predetermined locations in the cluster block;

determining the first logical address associated with the first journal entry;

determining that the second journal entry will not be copied to a new cluster block;

determining the first physical data location associated with the first journal entry without referring to the separate bad block map;

determining a first indirection entry in the indirection mapping table using the first logical address;

comparing the first physical data location to a physical data location associated with the first indirection entry;

determining that the first physical data location matches the physical data location associated with the first indirection entry;

writing the data stored at the first physical location to a new physical location in the new cluster block; and writing a new journal entry to a second journal at a predetermined location on the new cluster block, the new journal entry mapping the new physical data location in the new cluster block to the first logical address.

16. The computer-implemented method of claim 15, further comprising:
parsing the first journal to identify a third journal entry that maps a third physical data location in the cluster block to a second logical address;
determining the second logical address associated with the third journal entry;
determining the third physical data location associated with the third journal entry;
determining a second indirection entry in the indirection mapping table using the second logical address;
comparing the third physical data location to a physical data location associated with the second indirection entry;
determining that the third physical data location does not match the physical data location associated with the second indirection entry; and
ignoring the data stored at the third physical data location.

17. The computer-implemented method of claim 15, further comprising:
determining that all journal entries of the first journal have been parsed;
identifying a next journal associated with the cluster block from a second predetermined location in the cluster block; and
determining that a journal entry in the next journal has a physical data location that matches a corresponding indirection entry in the indirection mapping table.

18. The computer-implemented method of claim 15, further comprising:
determining that each of the plurality of journals stored at predetermined locations in the cluster block have been parsed;
enabling the cluster block to be erased; and
determining a next cluster block for garbage collection.

* * * * *